United States Patent Office 3,758,465
Patented Sept. 11, 1973

---

3,758,465
TRINUCLEAR COMPLEX MEROCYANINE DYES
Philip W. Jenkins, Rochester, N.Y., assignor to Eastman Kodak Company, Rochester, N.Y.
No Drawing. Original application July 31, 1967, Ser. No. 657,082, now Patent No. 3,576,639, dated Apr. 27, 1971. Divided and this application June 1, 1970, Ser. No. 54,044
Int. Cl. C09b 23/10
U.S. Cl. 260—240.1        13 Claims

ABSTRACT OF THE DISCLOSURE

Trinuclear complex merocyanine dyes derived from 2-midazolin-4-ones, 2-imidazolin-4-thiones and 2-imidazolin-4-selenones are used advantageously as spectral sensitizing dyes in photographic image-forming materials.

---

This application is a division of my U.S. patent application Ser. No. 657,082, filed July 31, 1967, now U.S. Pat. 3,576,639, issued Apr. 27, 1971.

This invention relates to trinuclear complex merocyanine photographic sensitizing dyes and to photographic materials containing these dyes.

Trinuclear complex merocyanine dyes are known in the photographic art. For example, Sprague U.S. Pat. 2,263,018 describes certain trinuclear dyes for use in light filtering layers of photographic elements. New trinuclear dyes for use as sensitizers in photographic materials are desired.

It is therefore an object of my invention to provide a valuable new class of trinuclear complex merocyanine dyes derived from a 2-imidazolin-4-one, a 2-imidazolin-4-thione and a 2-imidazolin-4-selenone, that are used to advantage as spectral sensitizers in photographic materials. Another object is to provide photographic materials that are spectrally sensitized by my valuable trinuclear complex merocyanine dyes. Still other objects will become evident from the following specification and claims.

These and other objects are accomplished according to my invention by the synthesis and use of my trinuclear complex merocyanine dyes derived from a 2-imidazolin-4-one, a 2-imidazolin-4-thione and a 2-imidazolin-4-selenone which forms the middle nucleus of the dye, the said dye having as the terminal acidic nucleus any acidic nucleus derived from an active methylene compound used in the preparation of a merocyanine dye, such that the terminal acidic nucleus is separated from the middle nucleous by at least one vinyl group. The terminal acidic nucleus is derived from either a cyclic compound having a methylene group activated by a carbonyl group (e.g., a ketomethylene heterocyclic compound particularly having from 4- to 6-atoms in the heterocyclic ring, a carbocyclic compound having from 4- to 6-atoms in the ring) or a noncyclic, i.e., an open-chain compound (e.g., malononitrile, an ester of malonic acid, etc.).

My trinuclear complex merocyanine dyes include those having the formula:

(I)
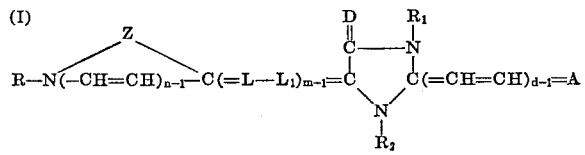

wherein R represents and alkyl group having from 1 to 12 carbon atoms (e.g., methyl, sulfoethyl, hydroxyethyl, hydroxypropyl, sulfobutyl, carboxybutyl, hexyl, octyl, dodecyl, etc.) and an aryl group (e.g., phenyl, sulfophenyl, carboxyphenyl, tolyl, etc.); Z represents the non-metallic atoms required to complete any heterocyclic nucleus used as the basic nucleus in a merocyanine dye particularly those having from 5- to 6-atoms in the heterocyclic ring, such as, a thiazole nucleus (e.g., thiazole, 4-methylthiazole, 4-phenylthiazole, 5-methylthiazole, 4,5-dimethylthiazole, 4,5-diphenylthiazole, etc.), a benzothiazole nucleus (e.g., benzothiazole, 4-chlorobenzothiazole, 5-chlorobenzothiazole, 6-chlorobenzothiazole, 7-chlorobenzothiazole, 4 - methylbenzothiazole, 6 - methylbenzothiazole, 5-bromobenzothiazole, 5-methoxybenzothiazole, 6-iodobenzothiazole, 5,6-dimethoxybenzothiazole, etc.), a naphthothiazole nucleus (e.g., α-nephthothiazole, β-naphthiothiazole, 5-methoxy-β-naphthothiazole, 8-ethoxy-α-naphthothiazole, β,β-naphthothiazole, etc.), a thianaphtheno - 7',6',4,5-triazole nucleus (e.g., 4'-methoxythianaphtheno-7',6',4,5-thiazole, etc.), an oxazole nucleus (e.g., 4-methyloxazole, 5-methoxyloxazole, 4-phenyloxazole, 4,5-diphenyloxazole, 4-ethyloxazole, 4,5-diethyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6 - dimethylbenzoxazole, 5 - ethoxybenzoxazole, 5,6-dichlorobenzoxazole, 5 - hydroxybenzoxazole, etc.), a naphthoxazole nucleus (e.g., α-naphthoxazole, β-naphthoxazole, β, β-naphthoxazole, etc.), a selenazole nucleus (e.g., 4-methylselenazole, 4-phenylsenenazole, etc.), a benzoselenazole nucleus (e.g., benzoselenazole, 5-chlorobenzoselenazole, 6 - methoxybenzoselenazole, 5-hydroxybenzoselenazole, a tetrahydrobenzoselenazole, etc.), a naphthoselenazole nucleus (e.g., α-naphthoselenazole, β-naphthoselenazole, β,β-naphthoselenazole, etc.), a thiazoline nucleus( e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 3-quinoline, 3-methyl-2-quinoline, 5-ethyl-2-quinoline, 6-chloro-2-quinoline, 8-chloro-2-quinoline, 4-methoxy-2-quinoline, 8-hydroxy-2-quinoline, etc.), a 4-quinoline nucleus (e.g., 4-quinoline, 5-methyl-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenine nucleus (e.g., 3-3-dimethylindoline, 3,3,5-trimethylindolenine, 3,3,7-trimethylindolenine, etc.), an imidazole nucleus (e.g., imidazole, 1-alkylimidazole, 1-alkyl - 4-phenylimidazole, 1-alkyl-4,5-dimethylimidazole, etc.), a benzimidazole nucleus (e.g., benzimidazole, 1-alkylbenzimidazole, 1 - arylbenzimidazole, 5,6 - dichlorobenzimidazole, etc.), a naphthimidazole nucleus (e.g., 1-alkyl - α - naphthimidazole, 1-aryl-β-naphthimidazole, 1-alkyl-5-methoxy-β-naphthimidazole, etc.); $n$ is an integer of from 1 to 2; L and $L_1$ represent methine groups (e.g., —CE— where E represents hydrogen, a lower alkyl, such as methyl, butyl, etc., an aryl group such as tolyl, naphthyl, etc., and a heterocyclic group, such as 2-thionyl, 2-pyroyl, 3-pyryl, 2-indolyl, 3-indolyl, 3-pyridyl, 4-pyridyl, etc.), such that not more than one L and $L_1$ contains an E group that is other than hydrogen; $m$ represents an integer of from 1 to 2; D represents an oxygen atom, a sulfur atom, or a selenium atom; $R_1$ represents the hydrogen atom, an alkyl group (e.g., methyl, ethyl, sulfoethyl, carboxyethyl, butyl, octyl, dodecyl, etc.) and an aryl group (e.g., phenyl, tolyl, etc.), $R_2$ represents the hydrogen atom, an alkyl group (e.g., methyl, ethyl, carboxyethyl, N,N-dimethylaminoethyl, butyl, sulfobutyl, octyl, dodecyl, etc.), and an aryl group (e.g., phenyl, tolyl, etc.); $d$ is an integer of from 2 to 3; A represents any acidic nucleus (cyclic or noncyclic) used as a terminal nucleus of a merocyanine dye including a 4- to 6-membered ketomethylene heterocyclic nucleus, such as, a 3-thietanone-1,1-dioxide (e.g., 3-thietanone-1,1-dioxide, 2-methyl - 3 - thietanone - 1,1 - dioxide, 2,2-dimethyl-3-thietanone - 1,1 - dioxide, 2,2-dipropyl-3-thietanone-1,1-dioxide, etc.), a 2-thio-2,4-thiazolidinedione, i.e., rhodanine, 3-ethylrhodanine, 3-sulfobutylrhodanine, 3-carboxylethylrhodanine, 3-phenylrhodanine, 3-carboxyphenylrhodanine, 3-(N,N-diethylaminoethyl)-rhodanine, etc.), a hexahydro-4,6-dioxo-2-thioxopyrimidine nucleus, i.e., a 2-thiobarbituric acid nucleus (e.g., 2-thiobarbituric acid, 3-ethyl-2-thiobarbituric acid, 3-sulfobutyl-2-thiobarbituric acid, 1,3-diethyl-2-thiobarbiutric acid, 3-phenyl-2-thiobarbituric acid, 1-ethyl-2-thiobarbituric acid, 1,3-disulfophenyl-2-thiobarbituric acid, etc.), a hexahydro-2,4,6-trioxopyrimidine nucleus, i.e., a barbituric acid (e.g., barbituric acid, 3-ethylbarbituric acid, 3-sulfobutylbarbituric acid, 1,3-diethylbarbituric acid, 3-phenylbarbituric acid, 1-ethyl-3-phenylbarbituric acid, 1,3-disulfophenylbarbituric acid, etc.), a 2-thio-2,4-imidazolidinediene nucleus, i.e., a 2-thiohydantoin nucleus (e.g., 2-thiohydantoin, 3-ethyl-2-thiohydantoin, 1,3 - diethyl - 2 - thiohyantoin, 3-carboxyethyl - 2 - thiohydantoin, 3-phenyl-1-sulfobutyl-2-thiohydantoin, etc.), a 2,4-imidazolidinedione nucleus, i.e., a hydantoin nucleus (e.g., hydantoin, 3-ethylhydantoin, 3-sulfobutylhydantoin, 3-ethyl-1-phenylhydanton, 1-ethyl-3-sulfophenylhydantoin, 3-tolyhydantoin, etc.), a 2-thio-2,4-oxazolidinedione nucleus (e.g., 2 - thio-2,4-oxazolidinedione, 3 - ethyl - 2 - thio-2,4-oxazolidinedione, 3-butyl-2 - thio-2,4-oxazolidinedione, 3-sulfobutyl-2-thio-2,4-oxazolidinedione, 3 - phenyl - 2-thio-2,4-oxazolidinedione, 3-sulfophenyl-2-thio-2,4-oxazolidinedione, etc.), a 2-thiazolin-4-one nucleus (e.g., 2-thiazolin-4-one, 2-diphenylamino - 2-thiazolin-4-one, diethylamino-2-thiazolin-4-one, 2(N-ethyl-N-phenylamino) - 2 - thiazolin -4 -one, etc.), a 2-pyrazolin-5-one nucleus (e.g., 2-pyrazolin-5-one, 3-methyl-1-phenyl-2-pyrazolin-5-one, 3-anilino-1 - tolyl - 2-pyrazolin-5-one, 1-chlorophenyl-3-phenylcarbonamido - 2-pyrazolin-5-one, etc.), a 2-imidazolin-4-one nucleus (e.g., 3 - ethyl - 1 - phenyl - 2 - thioxoimidazolin-4-one, 1,3-dibutyl - 2 - thioxoimidazolin-4-one, 1-methyl-3-phenyl-2-thioxoimidazolin-4-one, etc.), a 2-imidazolin-4-thiono nucleus (e.g., 3 - ethyl - 1-phenyl-2-thioxoimidazolin-4-thione, 1,3 - diethyl-2-thioxoimidazolin-4-thione, etc.), a 2-imidazolin-4-selenone nucleus (e.g., 3-ethyl-1-phenyl-2-thioxoimidazolin - 4 - selenone, 1,3 - diethyl-2-thioxoimidazolin-4-selenone, etc.), a carbocyclic ring, particularly containing from 4- to 6-atoms in the ring, such as, a 1,3-cyclopentanedione (e.g., 1,3-cyclopentanedione, 2-methyl-1,4-cyclopentanedione, etc.), a 1,3-cyclohexanedione nucleus (e.g., 1,3-cyclohexanedione, 5-methyl-1,3-cyclohexanedione, etc.) and a noncyclic, i.e., an open-chain compound, e.g., a malononitrile (e.g. malononitrile, phenylsulfonylacetonitrile, tolysulfonylacetonitrile, etc.), an ester of malonic acid (e.g., dimethylmalonate, diethylmalonate, etc.)

Included among the dyes of my invention are those advantageously represented by the formula:

wherein R, $R_1$, $R_2$, Z, L, $L_1$, D, $n$, $m$, and $d$ are as described previously; and Q represents are nonmetallic atoms required to complete a 4- to 6-membered ketomethylene nucleus such as, a 3-thietanone nucleus, a rhodanine nucleus, a 2-thiobarbituric acid nucleus, a barbituric acid nucleus, a 2-thiohydantoin nucleus, a hydantoin nucleus, a 2-thio-2,4-oxazolidinedione nucleus, a 2-thiazolin-4-one nucleus, a 2-pyrazolin-5-one nucleus, a 2-imidazolin-4-one nucleus, a 2-imidazolin-4-thione nucleus and a 2-imidazolin-4-selenone nucleus as have been described in greater detail with illustrative examples in the definitions given for A.

My dyes of Formula I and II in which $d$ is the integer 2 or 3 are advantageously prepared by condensing a dye of Formula III:

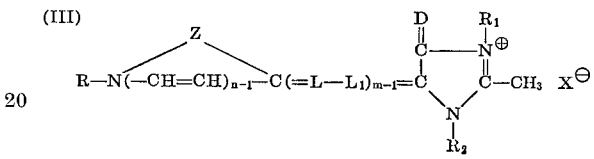

(III)

wherein Z, R, $R_1$, $R_2$, D, L, $L_1$, $n$ and $m$ are as described previously and $X^\ominus$ is an anion (e.g., bromine, iodide, chloride, methylsulfonate, phenylsulfonate, methylsulfate, ethylsulfate, p-toluenesulfonate, perchlorate, etc.), with an intermediate of Formula IVa or IVb:

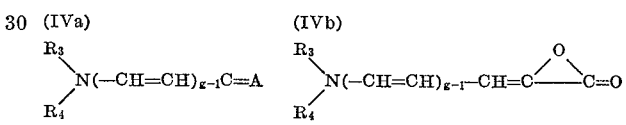

(IVa)     (IVb)

wherein A and Q are as described previously; $g$ is an integer of from 1 to 2; $R_3$ represents an acyl group (e.g., acetyl, propionyl, butyryl, benzoyl, etc.); $R_4$ represents an aryl group (e.g., phenyl, tolyl, etc.), dissolved in a suitable solvent such as, N,N-dimethylacetamide, quinoline, pyridine, butanol, ethanol, etc., in the presence of acetic anhydride, and a basic condensing agent such as triethylamine, N,N-diethylaniline, N-methylpyrrolidone and similar compounds. Heat accelerates the condensation, although temperatures varying from room temperature to the reflux temperature of the reaction mixture can be employed to advantage. My dyes of Formula I and II in which $d$ is the integer 2 are advantageously prepared by condensing an intermediate of Formula V:

(V)

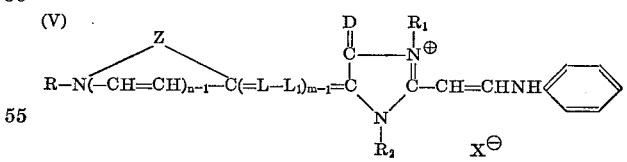

wherein Z, R, $R_1$, $R_2$, D, L, $L_1$, $n$, $m$ and $X^\ominus$ are as described previously with an intermediate of Formula VIa or VIb:

(VIa)                     (VIb)

(II)

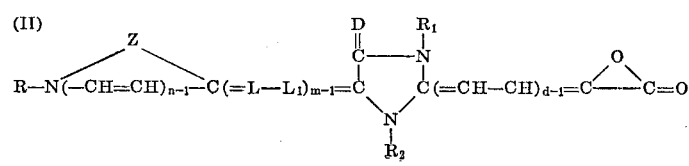

in which A and Q are as defined previously, dissolved in a suitable solvent such as those indicated for use in condensation of compounds of Formula III with IVa or IVb, in the presence of acetic anhydride and a basic condensing agent such as has already been listed. The reaction rate is advantageously accelerated by heat to adjust the temperature of the reaction mixture in the range from room temperature to the reflux temperature.

Intermediates of Formula III are well-known and have been described in references such as East German Pat. 8052, issued Jan. 17, 1955, East German Pat. 9740, issued May 2, 1955, French Pat. 1,445,548, and U.S. Pat. 2,927,026, issued May 1, 1960. The intermediates of Formula V are prepared from intermediates of Formula III by reaction with ethylisoformanilide dissolved in a suitable solvent such as ethanol, butanol, N,N-dimethyl acetamide, pyridine, quinoline, etc. This reaction is advantageously accelerated by heating under reflux.

The intermediates of Formulas IVa, IVb, VIa and VIb are well-known in the art.

My invention is further illustrated by the following dyes which, however, are not to be construed as limiting the invention. The preparation of dyes A through D used in the following syntheses are given after the preparation of Dye 21.

(1) 5 - (3 - ethyl-2-benzothiazolinylidene)-2-[(3-ethyl-4-oxo-2-thioxo-5-thiazolidinylidene)ethylidene]-1-phenyl-4-imidazolidinone

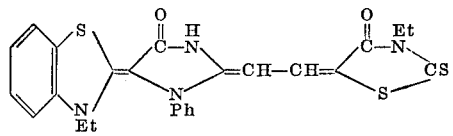

Dye A, 2-(2-anilinovinyl)-5-(3-ethyl-2-benzothiazolinylidone) - 1 - phenyl-2-imidazolin-4-one hydroperchlorate (1 mol., 2.00 g.), 3-ethylrhodanine (1 mol. +100%, 1.15 g.), acetic anhydride (1 mol. +100%, 0.70 g.) and triethylamine (1 mol. +100%, 1.00 g.) were dissolved in N,N-dimethylacetamide (15 ml.), and the solution was heated with stirring at 130–140° C. for five minutes. The hot mixture was cooled and diluted with water (150 ml.). The dye suspension was chilled overnight. The crude dye was collected by filtration, washed with methanol, and dried. The product was recrystallized twice from N,N-dimethylacetamide and methanol and then boiled with two portions of methanol (75 ml.), filtering the hot solution each time. After recrystallizing the methanol-insoluble dye twice more from N,N-dimethylacetamide and methanol, the yield of pure dye was 0.15 g. (9%), M.P. 288.5–289.5° C. dec.

(2) 5 - [(3 - ethyl-2-benzoxazolinylidene)ethylidene]-2-[(3 - ethyl - 4 - oxo-2-thioxo-5-thiazolidinylidene)ethylidene]-1-phenyl-4-imidazolidinone Dye B, 2-(2-anilinovinyl)-5-[(3-ethyl-2-benzoxazolinylidene)ethylidene] - 1-phenyl-2-amidazolin-4-one hydriodide (1 mol., 1.65 g.), 3-ethylrhodanine (1 mol. +100%, 0.95 g.), acetic anhydride (1 mol. +100%, 0.60 g.) and triethylamine (1 mol. +100%, 0.90 g.) were dissolved in N,N-dimethylacetamide (10 ml.), and the solution was heated with stirring at 140–147° C. for five minutes. The reaction mixture was cooled and diluted with water (150 ml.). After chilling the dye suspension overnight, the crude dye was collected by filtration, washed with water and dried in a vacuum oven. The crude product was boiled with methanol (100 ml.). The mixture was chilled. The dye was collected by filtration and washed with methanol. After two recrystallizations from N,N-dimethylacetamide and methanol, the yield of pure dye was 0.90 g. (52%), M.P. 277.0–278.0° C. dec.

(3) 5 - [(3 - ethyl - 2-benzoxazolinylidene)ethylidene]-2-[(1 - ethylhexahydro-4,6-dioxo-2-thioxo-5-pyrimidinylidene)ethylidene]-1-phenyl-4-imidazolidinone

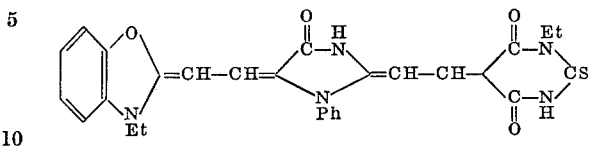

Dye B, 2-(2-anilinovinyl)-5-[(3-ethyl-2-benzoxazolinylidene)ethylidene] - 1 - phenyl-2-imidazolin-4-one hydriodide (1 mol., 2.90 g.), 1-ethyl-2-thiobarbituric acid (1 mol. +100%, 1.70 g.), acetic anhydride (1 mol. +100%, 1.00 g.) and triethylamine (1 mol. +100%, 1.50 g.) were dissolved in N,N-dimethylacetamide (15 ml.). After chilling the dye suspension overnight, the crude product was collected by filtration, washed with water and dried in a vacuum oven. The crude product was boiled with N,N-dimethylacetamide (100 ml.), and the mixture was filtered hot collecting the insoluble dye on a filter. After two recrystallizations from cresol and methanol, the yield of pure dye was 0.35 g. (13%), M.P. >315° C.

(4) 3 - ethyl - 5 - (3-ethyl-2-benzothiazolinylidene)-2-[(3-ethyl - 4 - oxo-1-phenyl-2-thioxo-5-imidazolidinylidene)ethylidene]-1-phenyl-4-imidazolidinone Dye C, 2-(2-anilinovinyl)-3-ethyl-5-(3-ethyl-2-benzothiazolinylidene) - 4 - oxo-1-phenyl-2-imidazolinium perchlorate (1 mol., 2.05 g.), 3-ethyl-1-phenyl-2-thiohydantoin (1 mol. +370% 3.7 g.), acetic anhydride (1 mol. +180%, 1.0 g.) and triethylamine (1 mol. +220%, 1.5 g.) were dissolved in N,N-dimethylacetamide (15 ml.), and the solution was heated with stirring at 125–135° C. for five minutes. The reaction mixture was cooled and diluted with water (100 ml.). After chilling the dye suspension overnight, the crude product was collected by filtration and washed and dried in a vacuum oven. The crude product was boiled with methanol (25 ml.). The mixture was chilled and the dye was collected by filtration. The crude dye was boiled with a second portion of methanol (25 ml.) and the mixture was filtered hot collecting the insoluble dye on a filter funnel. After one recrystallization from N,N-dimethylacetamide and methanol, the yield of pure dye was 0.20 g. (9%), M.P. 284.0–285.0° C. dec.

(5) 2 - [(2 - diphenylamino-4-oxo-2-thiazolin-5-ylidene)ethylidene] - 3-ethyl-5-[(3-ethyl-2-benzoxazolinylidene)ethylidene]-1-phenyl-4-imidazolidinone Dye D, 2-(2-anilinovinyl)-3-ethyl-5-[(3-ethyl-2-benzoxazolinylidene)ethylidene] - 4 - oxo-1-phenyl-2-imidazolinium iodide (1 mol., 2.50 g.), 2-diphenylamino-2-thiazolin-4-one (1 mol. +45%, 1.60 g.), acetic anhydride (1 mol. +140%, 1.00 g.) and triethylamine (1 mol. +160%, 1.50 g.) were dissolved in pyridine (15 ml.), and the solution was heated under reflux for twenty minutes. The reaction mixture was diulted with water (150 ml.). After chilling overnight the water layer was decanted. The residual oil was washed with water and dried in a vacuum oven. The crude product was boiled with methanol. The mixture was chilled overnight, and the crude dye was collected by filtration, washed with methanol, and dried. After two recrystallizations from pyridine and methanol, the yield of pure dye was 0.45 g. (17%), M.P. 290.5–292.5° C. dec.

(6) 3-ethyl-5-[(3 - ethyl - 2 - benzoxazolinylidene)ethylidene] - 2 - [(3-ethyl-4-oxo - 1 - phenyl-2-thioxo-5-imidazolidylidene)ethylidene]-1-phenyl-4-imidazolidinone Dye D, 2-(2-anilinovinyl)-3-ethyl-5-[(3-ethyl-2-benzoxazolinylidene)ethylidene] - 4 - oxo-1-phenyl-2-imidazolinium iodide (1 mol., 5.30 g.), 3-ethyl-1-phenyl-2-thiohydantoin (1 mol., +280%, 7.40 g.), acetic anhydride (1 mol. +240%, 2.00 g.) and triethylamine (1 mol. +250%, 4.00 g.) were dissolved in pyridine (25 ml.), and the solution was heated under reflux for five minutes. The reaction mixture was cooled and diluted with water (150 ml.). After chilling the dye suspension, the crude dye was collected by filtration, washed with water and dried in a vacuum oven. The crude product was boiled with methanol (50 ml.). The resulting mixture was chilled and the dye was collected by filtration, washed with methanol and dried. The weight of crude dye was 4.75 g. (90%). After recrystallization of one-half of this sample three times from pyridine and methanol, the yield of pure dye was 0.35 g. (13%, corrected), M.P. 255.0–257.0° C. dec.

(7) 3-ethyl-5-[(3 - ethyl - 2 - benzoxazolinylidene)ethylidene] - 2 - [(1-ethylhexahydro-4,6-dioxo-2-thioxo-5-pyrimidinylidene)ethylidene]-1-phenyl-4-imidazolidinone 3-ethyl - 5 - [(3-ethyl - 2 - benzoxazolinylidene)ethylidene]-2-methyl-4-oxo-1-phenyl-2-imidazolidinium iodide (1 mol., 1.25 g.), 5-anilinomethylene-1-ethyl-2-thiobarbituric acid (1 mol., 0.70 g.), acetic anhydride (1 mol. +100%, 0.50 g.) and triethylamine (1 mol., 0.75 g.) were dissolved in pyridine (10 ml.), and the solution was heated under reflux for fifteen minutes. The reaction mixture was cooled and diluted with methanol (75 ml.). After chilling the mixture overnight the crude dye was collected by filtration, washed with methanol, and dried. After two recrystallizations from pyridine and methanol, the crude dye was dissolved in hot pyridine containing acetic anhydride. The resulting solution was first treated with N,N-diethylethylenediamine and then diluted with methanol. This solution was chilled and the dye was collected by filtration, washed with methanol and dried. After one additional recrystallization from pyridine and methanol the yield of pure dye was 0.20 g. (14%), M.P. 302.0–303.0° C. dec.

(8) 3-ethyl-5-[(3 - ethyl - 2 - benzoxazolinylidene)ethylidene]-2-[(3-methyl - 5 - oxo - 1 - phenyl-2-pyrazolin-4-ylidene)ethylidene]-1-phenyl-4-imidazolidinone 3-ethyl - 5 - [(3-ethyl - 2 - benzoxazolinylidene)ethylidene]-2-methyl-4-oxo-1-phenyl-2-imidazolinium iodide (1 mol., 1.25 g.), 4-anilinomethylene-3-methyl-1-phenyl-2-pyrazolin-5-one (1 mol., 0.70 g.), acetic anhydride (1 mol. +100%, 0.50 g.) and triethylamine (1 mol. +100%, 0.75 g.) were dissolved in pyridine (10 ml.), and the solution was heated under reflux for twenty minutes. The hot reaction mixture was treated first with acetic anhydride (5 ml.) and then with N,N-diethylethylenediamine (5 ml.). The resulting mixture was diluted with methanol (125 ml.). After chilling the solution overnight, the crude dye was collected by filtration, washed with methanol and dried. After two recrystallizations from N,N-dimethylformamide and methanol, the yield of pure dye was 0.50 g. (43%), M.P. >310°C.

(9) 1,3 - diethyl-5-[(1-ethylnaphtho[1,2-d]thiazolin-2-ylidene)ethylidene] - 2 - [(3-ethyl-4-oxo-2-thioxo-5-thiazolidinylidene)ethylidene]-4-imidazolidinone 1,3-diethyl - 5 - [(1-ethylnaphtho[1,2-d]thiazolin-2-ylidene)ethylidene]-2-methyl-4-oxo-2-imidazolinium iodide (1 mol., 1.30 g.), 5-acetanilidomethylene-3-ethylrhodanine (1 mol., 0.80 g.), acetic anhydride (200% excess, 0.50 g.) and triethylamine (1 mol. +200%, 0.75 g.) was dissolved in pyridine (10 ml.) and the solution wes heated under reflux for twenty minutes. The hot reaction mixture was transferred to a beaker containing acetic anhydride (2.0 ml.). The warm solution was treated first with N,N-diethylethylenediamine (2.0 ml.) and then diluted with methanol (125 ml.). The solution was chilled overnight and the crude dye was collected by filtration, washed with methanol and dried. The crude dye was recrystallized by dissolving in hot pyridine containing acetic anhydride. The resulting solution was first treated with N,N-diethylethylenediamine and then diluted with methanol. The solution was chilled and the dye was collected by filtration, washed with methanol and dried. After a final recrystallization from pyridine and methanol, the yield of pure dye was 0.45 g. (32%), M.P. 253.0–255.0° C. dec.

(10) 1,3-diethyl-5-[(3-ethyl-2-benzoxazolinylidene)ethylidene]-2-[(3 - ethyl-4-oxo-2-thioxo-5-oxazolidinylidene)ethylidene]-4-imidazolidinone 1,3-diethyl - 5 - [(3-ethyl-2-benzoxazolinylidene)ethylidene]-2-methyl-4-oxo - 2 - imidazolinium iodide (1 mol., 1.50 g.), 5-acetanilidomethylene-3-ethyl-2-thio-2,4-oxazolidinedione (1 mol., 0.95 g.), acetic anhydride (100% excess, 0.35 g.) and triethylamine (1 mol. +100%, 0.70 g.) were dissolved in pyridine (10 ml.), and the solution was heated under reflux for fifteen minutes. The reaction mixture was cooled and diluted with methanol (100 ml.). The solution was chilled overnight, and the crude product was collected by filtration, washed with methanol and dried. After two recrystallizations from pyridine and methanol the yield of pure dye was 0.70 g. (43%), M.P. 251.5–252.5° C. dec.

(11) 3-ethyl - 2 - [(3-ethyl-4-oxo-2-thioxo-5-thiazolidinylidene)-2-butenylidene] - 1 - phenyl-5-[(1,3,3-trimethyl-2-indolinylidene)ethylidene]-4-imidazolidinone.

3-ethyl-2-methyl-4-oxo-1-phenyl - 5 - [(1,3,3-trimethyl-2-indolinylidene)ethylidene] - 2 - imidazolinium iodide (1 mol., 1.70 g.), 5-acetanilidoallylidene-3-ethylrhodanine (1 mol., 110 g.), acetic anhydride (100% excess, 0.35 g.) and triethylamine (1 mol. +100%, 0.70 g.) were dissolved in N,N-dimethylacetamide (10 ml.), and the mixture was heated with stirring at 125–135° C. for five minutes. Further amounts of acetic anhydride (0.35 g.) and triethylamine (0.35 g.) were added and heating was continued for ten minutes. The reaction mixture was cooled and diluted with water (100 ml.). The dye suspension was chilled overnight, and the crude product was collected by filtration, washed with water and dried in a vacuum oven. This crude product was boiled with methanol (50 ml.). After allowing the solution to cool to room temperature, the crude dye was isolated by filtration and washed with methanol. The crude dye was recrystallized by dissolving in hot pyridine containing acetic anhydride. The resulting solution was first treated with N,N-diethylethylenediamine and then diluted with methanol. The solution was chilled, and the dye was collected by filtration and washed with methanol. Aftet a second recrystallization from pyridine and methanol the yield of pure dye was 0.18 g. (9%), M.P. 268.0–270.0 °C. dec.

(12) 3-ethyl-5-[(3-ethyl - 2 - benzoxazolinylidene)ethylidene]-2-[(3 - ethyl-4-oxo-2-thioxo-5-thiazolidinylidene)ethylidene]-1-phenyl-4-imidazolidinone Dye 12 is advantageously prepared by a method similar to that used to prepare dye 2 but by using an equimolar amount of Dye D, i.e., 2-(2-anilinovinyl)-3-ethyl-5-[(3-ethyl - 2- benzoxazolinylidene)ethylidene] - 1 - phenyl-2-imidazolinium iodide in place of Dye B, i.e., 2-(2-anilinovinyl)-5-[(3-ethyl - 2 - benzoxazolinylidene)ethylidene]-1-phenyl-2-imidazolin-4-one hydroiodide. Dye 12 has a M.P. of 237–238° C.

(13) 2[(2 - diphenylamino - 4 - oxo - 2 - thiazolin - 5-ylidene)ethylidene]-3-ethyl - 5 - [(1,3,3 - trimethyl-2-indolinylidene)ethylidene]-1-phenyl-4-imidazolidinone Dye 13 is advantageously prepared by methods similar to that used to prepare Dye 5 but by using an equimolar amount of 2-(2-anilinovinyl)-3-ethyl-4-oxo-1-phenyl-5-[(1,3,3 - trimethyl - 2 - indolinylidene)ethylidene] - 2-imidazolinium iodide in place of Dye D, 2-(2-anilinovinyl) - 3 - ethyl-5-[(3-ethyl-2-benzoxazolinylidene) ethylidene)ethylidene] - 4 - oxo - 1 - phenyl-2-imidazolinium (14) 2 - [(1 - carboxymethyl-4-oxo-3-phenyl-2-thioxo-5-iodide. Dye 13 has a M.P. of 247–248° C. dec.

imidazolidenylidene)ethylidene] - 3 - ethyl - 1 - phenyl-5 - [(1,3,3 - trimethyl-2-indolinylidene)ethylidene]-4-imidazolidinone Dye 14 is advantageously prepared by a method similar to that used to prepare dye 6 but by using an equimolar amount of 2-(2-anilinovinyl)-3-ethyl-4-oxo-1-phenyl - 5 - [(1,3,3 - trimethyl - 2 - indolinylidene)ethylidene]-2-imidazolinium iodide in place of 2-(2-anilinovinyl - 3 - ethyl-5-[(3-ethyl-2-benzoxazolinylidene)ethylidene]-4-oxo-1-phenyl-2-imidazolinium iodide and an equimolar amount of 1-carboxymethyl-3 phenyl-2-thiohydantoin in place of 3-ethyl-1-phenyl-2-thiohydantoin. Dye 14 has a M.P. of 259–261° C.

(15) 2 - (3,3 - dicyanoallylidene) - 3 - ethyl - 1 - phenyl - 5 - [(1,3,3-trimethyl-2-indolinylidene)ethylidene]-4-imidazolidinone 3 - ethyl - 2 - methyl-4-oxo-1-phenyl-5-[(1,3,3-trimethyl-2-indolinylidene)ethylidene] - 2 - imidazolinium iodide (1 mol., 2.55 g.) ethylisoformanilide (1 mol.) +200%, 2.25 g.) and 15 ml. of pyridine were mixed and heated under reflux for one-half hour. The reaction mixture was transferred to a beaker, diluted with 500 ml. of diethyl ether and chilled. The dye suspension in diethyl ether was filtered, the dye washed with diethyl ether and dried. This material (2.5 g.) was mixed with malononitrile (1 mol. +100%, .65 g.), acetic anhydride (1 mol., +100%, 1.0 g.), triethylamine (1 mol. +100%, 1.5 g.) and N,N-dimethylacetamide (15 ml.) and heated to 130–140° for five minutes. The mixture was transferred to a beaker and diluted with 150 ml. of distilled water and chilled. The dye suspension was filtered and the dye washed with water and dried in a vacuum oven (at 60°). The dye purified by recrystallization had a M.P. of 283–285° C.

(16) 2 - (3,3 - dicyanoallylidene) - 3 - ethyl - 5 - [(3-ethyl-2-benzoxazolinylidene)ethylidene] - 1 - phenyl - 4-imidazolidinone 3 - ethyl - 5 - [(3-ethyl-2-benzoxazolinylidene)ethylidene]-2-methyl-4-oxo-1-phenyl-2-imidazolinium iodide (1 mol., 1.7 g.), 1-anilino-2,2-dicyanoethylene (1 mol., 0.6 g.), acetic anhydride (1 mol. +100%, 0.7 g.) and triethylamine (1 mol. +100%) in pyridine (15 ml.) were mixed and heated under reflux for five minutes. The reaction mixture was transferred to a beaker, diluted with 150 ml. of distilled water and chilled. The suspended dye was filtered and the dye washed with water and dried in a vacuum oven (at 60°). The dye product after recrystallization had a M.P. greater than 315° C.

(17) 2 - (3,3 - dicyanoallylidene) - 3 - ethyl - 5 - [(3-ethyl-2-benzothiazolinylidene)ethylidene] - 1 - phenyl-4-imidazolidinone This dye was prepared like dye 16 but substituting a equimolar amount of 3-ethyl-5-[(3-ethyl-2-benzothiazolinylidene)ethylidene] - 2 - methyl-4-oxo-1-phenyl-2-imidazolinium iodide in place of the 3-ethyl-5-[(3-ethyl-2 - benzoxazolinylidene)ethylidene] - 2 - methyl-4-oxo-1-phenyl-2-imidazolinium iodide. The purified dye obtained by recrystallization had a M.P. of 311.5–312.5° C.

(18) 2 - (3,3 - dimethoxycarbonylallylidene) - 3 - ethyl-5-[(3 - ethyl - 2 - benzoxazolinylidene)ethylidene]-1-phenyl-4-imidazolidinone This dye is advantageously prepared by a method similar to that used to make dye 16 except that an equimolar amount of 1-anilino-2,2-dimethoxycarbonylethylene is used in place of 1-anilino-2,2-dicyanoethylene.

(19) 3 - ethyl - 5 - [(3-ethyl-2-benzoxazolinylidene)ethylidene] - 1 - phenyl-2-[(1,1,3-trioxothietan-2-ylidene)ethylidene]-4-imidazodidinone This dye is advantageously prepared by a method similar to that used to make dye 16 except that an equimolar amount of 2-anilinomethylene-3-thietanone-1,1-dioxide is used in place of 1-anilino-2,2-dicyanoethylene.

(20) 1 - [(2,6 - dioxocyclohexanylidene)ethylidene]-3-5 - [(3 - ethyl - 2 - benzoxazolinylidene)ethylidene]-1-phenyl-4-imidazolidinone This dye is advantageously prepared by methods similar to those used to make dye 16 except that an equimolar amount of 2 - anilinomethylene-1,3-cyclohexanedione is used in place of 1-anilino-2,2-dicyanoethylene.

(21) 5 - (3 - ethyl - 2 - benzothiazolinylidone)-2-[(3-ethyl - 4-oxo-2-thioxo-5-thiazolidinylidene)ethylidene]-1-phenyl-4-imidazolidinthione This dye is advantageously prepared by the method used to make dye 1 excepting that an equimolar amount of 2-(2-anilinovinyl)-5-(3-ethyl-2-benzothiazolinylidene)-1-phenyl-2-imidazolin-4-thione hydroperchlorate is used in place of 2-(2-anilinovinyl)-5-(3-ethyl-2-benzothiazolinylidene)-1-phenyl-2-imidazolin-4-one hydroperchlorate.

(22) 2 - [(3 - methyl - 5 - oxo-1-phenyl-2-pyrazolin-4-ylidene)ethylidene]-1-phenyl - 5 - [(1,3,3 - trimethyl-2-indolinylidene)ethylidene]-4-imidazolidinone Dye 22 is advantageously prepared by methods similar to that used to prepare dye 8 but by using an equimolar amount of 2-methyl-4-oxo-1-phenyl-5-[(1,3,3-trimethyl-2-indolinylidone)ethylidene]-2-imidazolinium hydriodide in place of 3-ethyl-5-[(3-ethyl-2-benzoxalinylidene)ethylidene] - 2 - methyl-4-oxo-1-phenyl-2-imidazolinium iodide. Dye 22 has a M.P. of 237.5–238.5° C. dec.

(23) 3 - ethyl - 5 - [(3 - ethyl - 2 - benzothiazolidinylidene)isopropylidene] - 2 - [(3-ethyl-4-oxo-2-thioxo-5-thiazolidinylidene)ethylidene] - 1 - phenyl-4-imidazolidinone Dye 23 is advantageously prepared like Dye 9 but by using an equimolar amount of 3-ethyl-5-[(3-ethylbenzothiazolidinylidene)isopropylidene] - 2 - methyl-4-oxo-1-phenyl-2-imidazolinium iodide in place of 1,3-diethyl-5-[(2 - ethylnaphtho-[1,2-d]-thiazolin - 2 - ylidene)ethylidene]-2-methyl-4-oxo-2-imidazolinium iodide. Dye 23 has a M.P. of 313.5–314.5° C. dec.

(24) 2-(3,3-dicyanoallylidene) - 3 - ethyl-5-[(3-ethyl-2-benzoxazolinylidene)ethylidene] - 1 - phenyl-4-imidazolidineselenone.

Dye 24 is advantageously prepared by first making 2(3,3-dicyanoallylidene)-3-ethyl - 5 - [(3-ethyl-2-benzoxazolinylidene)ethylidene] - 1 - phenyl - 4 - imidazolidinthione by a method similar to that used to make dye 16 but using an equimolar amount of 3-ethyl-5-[(3-ethyl-2-benzoxazolinylidene)ethylidene] - 2 - methyl-1-phenyl-4-thioxo-2-imidazolinium iodide in place of 3-ethyl-5-[(3-ethyl-2-benzoxazolinylidene)ethylidene] - 2 - methyl-4-oxo-1-phenyl-2-imidazolinium iodide. The 2-(3,3-dicyanoallylidene)-3-ethyl-5-[(3-ethyl - 2 - benzoxazolinylidene) ethylidene]-1-phenyl-4-imidazolidinthione is then converted to dye 24 by a method similar to that described in U.S. Pat. 2,332,433 by first treating with an alkyl salt (ester), to quaternize the acidic nucleus and then treating the quaternary salt formed dissolved in a suitable solvent with an alkali metal selenide, such as, sodium selenide.

Similarly, other dyes of my invention are prepared by using the appropriate intermediates.

The syntheses of the intermediates of Formula V are illustrated by the following typical examples.

Dye A, 2-(2-anilinovinyl)-5-(3-ethyl-2-benzothiazolinylidene)-1-phenyl-2-imidazolin-4-one hydroperchlorate 5-(3-ethyl - 2 - benzothiazolinylidene) - 2 - methyl-1-phenyl-2-imidazolin-4-one hydroperchlorate (1 mol., 4.35 g.) and ethyl isoformanilide (1 mol+300%, 6.00 g.) were dissolved in butanol (25 ml.), and the solution was heated under reflux for thirty-five minutes. After chilling the mixture overnight, the product was collected by filtration, washed thoroughly with ether and dried. This crude dye was employed without further purification as an intermediate in the preparation of additional dyes. A small sample of this crude dye (1.0 g.) was recrystallized from methanol containing sodium perchlorate and acetic acid. After a second recrystallization from methanol containing acetic acid, the yield of pure dye was 0.10 g. (11% corrected), M.P. 219.5–221.5° C. dec.

Dye B, 2-(2-anilinovinyl)-5-[(3-ethyl-2-benzoxazolinylidene)ethylidene]-1-phenyl-2-imidazolin-4-one hydriodide 5-[(3-ethyl - 2 - benzoxazolinylidene)ethylidene]-2-methyl-1-phenyl-2-imidazolin-4-one hydroiodide (1 mol., 4.75 g.) and ethyl isoformanilide (1 mol+300%, 6.00 g.) were dissolved in butanol (25 ml.), and the solution was heated under reflux for twenty minutes. The reaction mixture was chilled. The product was isolated by filtration and washed with ether. The yield of crude product was 2.65 g. (46%). This crude dye was employed without further purification as an intermediate in the preparation of additional dyes. A sample of this crude dye (0.65 g.) was recrystallized from methanol containing hydriodic acid. After a second recrystallization from methanol containing sodium iodide and acetic acid, the yield of pure dye was 0.45 g. (32% corrected), M.P. 282.0–283.0° C. dec.

Dye C, 2-(2-anilinovinyl)-3-ethyl-5-(3-ethyl - 2 - benzothiazolinylidene)-4-oxo-1-phenyl - 2 - imidazolinium perchlorate 3-ethyl-5-(3 - ethyl-2-benzothiazolinylidene)-2-methyl--4-oxo-1-phenyl-2-imidazolinium perchlorate (1 mol., 2.35 g.) and ethyl isoformanilide (1 mol+200%, 2.25 g.) were dissolved in N,N-dimethylacetamide (15 ml.), and the solution was heated under reflux for thirty minutes. The reaction mixture was cooled and diluted with ethyl ether (350 ml.). After chilling, the ether was decanted and the residual oil was dried in a vacuum oven. The yield of product was 2.05 g. (72%). This crude dye was employed without further purification as an intermediate in the preparation of additional dyes.

Dye D, 2-(2-anilinovinyl)-3-ethyl-5-[(3-ethyl-2-benzoxazolinylidene)ethylidene] - 4 - oxo-1-phenyl-2-imidazolinium iodide 3-ethyl-5-[(3-ethyl - 2 - benzoxazolinylidene)ethylidene]-2-methyl-4-oxo-1-phenyl-2-imidazolinium iodide (1 mol., 2.5 g.) and ethyl isoformanilide (1 mol+230%, 2.5 g.) were dissolved in pyridine (15 ml.), and the solution was heated under reflux for thirty minutes. The reaction was cooled and diluted with ether. After chilling overnight, the ether was decanted and the residual gum and powder was dried. This crude product, without additional purification, was suitable for use in further dye preparations. This material was washed with water (50 ml.) and collected by filtration. After drying, the crude product was boiled with methanol (50 ml.). After chilling, the crude dye was collected by filtration, washed with acetone, and dried. After two recrystallizations from methanol the yield of pure dye was 0.2 g. (7%), M.P. 266.0–267.5° C. dec.

My dyes are advantageously used to spectrally sensitize photographic materials. It is not obvious or expected that my dyes would be valuable spectral sensitizers since the very close dyes of U.S. Pat. 2,263,018 such as Dye X, i.e., 5-[(3-ethyl-2-benzoxazolinylidene)ethylidene]-2-[(3-ethyl-4-oxo - 2 - thioxo-5-thiazolidinylidene)ethylidene]-3-ethyl-4-thiazolidinone, and Dye Y, i.e., 3-ethyl-5-[(3-ethyl - 2 - benzoxazolinylidene)ethylidene]-2-[(1-ethylhexahydro - 4,6 - dioxo-2-thioxo-5-pyrimidinylidene)ethylidene]-4-thiazolidinone do not produce any spectral sensitization at all. This is illustrated by comparative data in Example 2 presented subsequently in the application.

My photographic materials may contain any of the silver halides or mixttures thereof dispersed in any of the hydrophilic colloids used in photographic emulsion containing natural materials, e.g., gelatin, albumin, agar-agar, gum arabic, alginic acid, etc., and synthetic materials, e.g., polyvinyl alcohol, polyvinyl pyrrolidone, cellulose ethers, partially hydrolyzed cellulose acetate, etc. My dyes are especialy useful for extending the spectral sensitivity of the customarily employed gelatino-silver chloride, gelatino-silver chlorobromide, gelatino-silver bromide and gelatino-silver bromoiodide emulsions. To prepare emulsions sensitized with one or more of the novel dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. A mixture of methyl alcohol and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e.g., from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver halide emulsion sensitized with one or more of our new dyes, the following procedure is satisfactory.

A quantity of dye is dissolved in a mixture of methanol and pyridine and a volume of this solution, which may be diluted with water, containing from 5 to 100 mg. of dye, is slowly added to about 10000 cc. of gelatino-silver-halide emulsion, with stirring. Stirring is continued until the dye is thoroughly dispersed in the emulsion.

With most of the dyes, from 10 to 20 mg. of dye per liter of gelatino-silver bromide or bromoiodide emulsion (containing about 40 g. of silver halide) suffices to produce the maximum sensitizing effect. With the finer grain emulsions, a somewhat larger concentration of dye may be needed to produce the maximum sensitizing effect.

The above statements are only illustrative, as it will be apparent that the dyes can be incorporated in photographic emulsions by any of the other methods customarily employed in the art, e.g., by bathing a plate or film upon which an emulsion is coated in a solution of the dye in an appropriate solvent. However, bathing methods are ordinarily not to be preferred. Emulsions, sensitized with the dyes can be coated on suitable supports, such as glass, cellulose derivative film, resin film or paper in the usual manner.

Photographic silver halide emulsions, such as those listed above, containing the sensitizing dyes of this invention can also contain such addenda as chemical sensitizers (e.g., sulfur sensitizers, such as allyl thiocarbamide, thiourea, allylisothiocyanate, cystine, etc.), various gold compounds (such as potassium chloroaurate, auric trichloride, etc.) (see U.S. Pats. 2,540,085; 2,597,856; and 2,597,915, for example, various palladium compounds (such as palladium chloride (U.S. 2,540,086), potassium chloropalladate (U.S. 2,598,079), etc., or mixtures of such sensitizers), antifoggants (e.g., benzotriazole, nitrobenzimidazole, 5-nitroindazole, etc. (see Mees: "The Theory of the Photographic Process," Macmillan Pub., 1942, p. 460), or mixtures thereof), hardeners (e.g., formaldehyde (U.S. 1,763,533), chrome alum (U.S. 1,763,533), glyoxal (German 538,713), dibromacrolein (Great Britain 406,750, etc.), color couplers (e.g., such as those described in U.S. 2,423,730, Spence and Carroll U.S. Pat. 2,640,776, issued June 2, 1953, etc.), or mixtures of such addenda. Dispersing agents for color couplers, such as substantially water-insoluble, high boiling crystalloidal materials, such as those set forth in U.S. Pats. 2,322,027 and 2,304,940, can also be employed in the above-described emulsions.

My invention is still further illustrated by the following typical examples showing the use of my dyes in photographic silver halide emulsion layers.

EXAMPLE 1

Typical dyes of my invention represented by Formula I are separately incorporated in an ordinary gelatino silver chlorobromide emulsion of the type described by Trivelli and Smith, Photo. Journal, 79 330 (1939). Sensitizing amounts of the dyes being added in the form of a solution and thoroughly incorporated in the emulsions by stirring. After a short digestion, the emulsions are coated onto ordinary cellulose acetate film supports and dried. The dried coatings are exposed in a spectrograph and sensitometer and developed in the usual way with Kodak developer D-19, fixed in a conventional sodium thiosulfate fixing bath, washed and dried. The sensitizing range and maximum in m$\mu$ and the sensitizing maximum in m$\mu$ are indicated in the following table.

TABLE I

| Dye Number: | Sensitization range in m$\mu$ | Sensitization maximum in m$\mu$ |
| --- | --- | --- |
| 1 | 475–680 | 630 |
| 2 |  | 740 | 690 |
| 3 | 475–680 | 625 |
| 4 | 490–690 | 655 |
| 5 | 480–730 | 670 |
| 6 | 485–750 | 715 |
| 7 | 480–700 | 650 |
| 8 | 480–700 | 645 |
| 9 | 580–800 | 760 |
| 10 | 555–715 | 688 |
| 11 |  | 800 |

EXAMPLE 2

The dyes indicated in Table II are separately incorporated in portions of any ordinary gelatino silver bromoiodide emulsion of the type described by Trivelli and Smith, Photo. Journal, 79, 330 (1939). Solutions of the dyes are thoroughly incorporated in the emulsions by stirring to give a dye concentration of 0.04 g./mol. of silver bromoiodide. After a short digestion the emulsions are coated onto ordinary conventional cellulose acetate supports and the coatings exposed and developed as described in Example 1. The data obtained are summarized in Table II.

TABLE II

| Dye Number: | Sensitizing range in (m$\mu$) | Sensitization maximum in (m$\mu$) |
| --- | --- | --- |
| 1 | ≤685 | 600 |
| 2 | ≤740 | 670 |
| 7 | ≤700 | 640 |
| 8 | ≤700 | 630 |
| 12 | ≤760 | 700 |

Example 2 is repeated using in place of Dyes 1, 2, 7, 8 and 12 Dye X, 5-[(3-ethyl-2-benzoxazolinylidene)ethylidene] - 2 - [(3 - ethyl - 4 - oxo - 2 - thioxo - 5 - thiazolidinylidene)ethylidene]-3-ethyl-4-thiazolidinone, and Dye Y, 3-ethyl-5-[(3-ethyl-2-benzoazolinylidene)ethylidene]-2 - [(1 - ethylhexahydro - 4,6 - dioxo - 2 - thioxo - 5 - pyrimidinylidene)ethylidene]-4-thiazolidinone which are dyes of U.S. Pat. 2,263,018. Dyes X and Y are found to produce no spectral sensitization of the gelatino silver bromoiodide emulsion.

Example 3

The dyes indicated in Table III are separately incorporated in portions of an ordinary gelatino silver bromoiodide emulsion of the type described by Trivelli and Smith, Phot. Journal, 79, 330 (1939), and at a concentration of 0.04 gram per mole of silver bromoiodide. The incorporation is accomplished by thoroughly mixing solutions of the respective dyes into the respective portion of the emulsion by stirring. After a short digestion, the emulsions are coated onto ordinary cellulose acetate supports and the coatings are exposed and developed as described in Example 1. The data are summarized in Table III.

TABLE III

| | Sensitization range in m$\mu$ | Sensitization maximum in m$\mu$ |
| --- | --- | --- |
| 15 | ≤620 | 605 |
| 16 | ≤660 | 600 |
| 17 | ≤710 | 640 |

Similarly, it can be shown that other dyes of my invention represented by the Formulas I and II are used to advantage as spectral sensitizers in still other hydrophilic colloid silver halide emulsions.

Use of my trinuclear spectral sensitizing dyes provides a valuable technical advance in the art of photography. My dyes are valuable for spectral sensitization of silver halide emulsions in black-and-white photographic materials or in color photographic materials which either contain incorporated color-forming couplers or are processed in color developers that contain the color-forming couplers. My dyes are advantageously used to spectrally sensitize silver halide emulsions that contain incorporated couplers. For such emulsions any of the well-known phenolic or naphtholic cyan-forming couplers, open-chain active methylene containing yellow-forming couplers (e.g., cyanoacetyl couplers, acylacetyl couplers, etc.), and the 5-pyrazolone magenta-forming couplers are used. Either or both the 4-equivalent or 2-equivalent couplers of these classes are used to advantage in emulsions containing my dyes. Typical couplers are described in many patents, including U.S. Pat. 3,046,129, issued July 24, 1962.

The invention has been described in detail with particular embodiments thereof, but it will be understood that variations and modifications can be effected within the spirit and scope of the invention as described hereinabove and as defined in the appended claims.

I claim:

1. A trinuclear complex merocyanine dye having the structural formula:

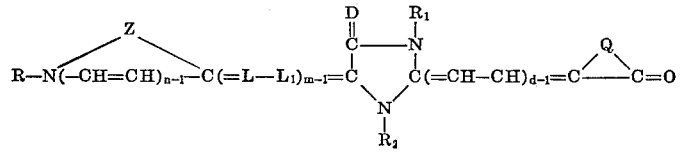

wherein R represents a group selected from the class consisting of an alkyl group having from 1 to 12 carbon atoms, phenyl, sulfophenyl, carboxyphenyl and tolyl; Z represents the nonmetallic atoms necessary to complete the heterocyclic ring, said nucleus being selected from the class consisting of a thiazole nucleus, a benzoxazole nucleus, a naphthothiazole nucleus, a thianaphtheno-7′,6′,4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-pyridine nucleus, a 4-pyridine nucleus, a 2-quinoline nucleus, a 4-quinoline nucleus, a 1 - isoquinoline nucleus, a 3 - isoquinoline nucleus, a 3,3 - dialkylindolenine nucleus, an imidazole nucleus, a benzimidazole nucleus, and a naphthimidazole nucleus; $n$ is an integer of from 1 to 2; L represents a methine group; $L_1$ represents a methine group; $m$ represents an integer of from 1 to 2; D represents an atom selected from the class consisting of oxygen, sulfur, and selenium; $R_1$ and $R_2$ each represents a group selected from the class consisting of hydrogen, an alkyl group having from 1 to 12 carbon atoms, phenyl and tolyl; $d$ is an integer of from 2 to 3; Q represents the nonmetallic atoms required to complete a 4- to 6-membered heterocyclic nucleus selected from the class consisting of a 3-thietanone-1,1-dioxide nucleus, a rhodanine nucleus, a thiobarbituric acid nucleus, a barbituric acid nucleus, a 2-thiohydantoin nucleus, a hydrantoin nucleus, a 2 - thio - 2,4 - oxazolidinedione nucleus, a 2-thiazolin - 4 - one nucleus, a 2-pyrazolin - 5 - one nucleus, a 2-imidazolin - 4 - one, a 2-imidazolin-4-thione, and a 2-imidazolin-4-selenone.

2. A trinuclear complex dye of claim 1 in which Q represents the nonmetallic atoms required to complete a rhodanine nucleus.

3. A trinuclear complex dye of claim 1 in which Q represents the nonmetallic atoms required to complete a 2-thio-2,4-oxazolidinedione nucleus.

4. A trinuclear complex dye of claim 1 in which Q represents the nonmetallic atoms required to complete a thiobarbituric acid nucleus.

5. A trinuclear complex dye of claim 1 in which Q represents the nonmetallic atoms required to complete a 2-thiohydantoin nucleus.

6. A trinuclear complex dye of claim 1 in which Q represents the nonmetallic atoms required to complete a 2-thiazolin-4-one nucleus.

7. A trinuclear complex dye of claim 1 in which Q represents the nonmetallic atoms required to complete a 2-pyrazolin-5-one-nucleus.

8. 1,3-diethyl - 5 - [(1 - ethylnaphtho[1,2-d]thiazolin-2-ylidene)ethylidene] - 2 - (3-ethyl - 4 - oxo-2-thioxo-5-thiazolidinylidene)ethylidene]-4-imidazolidinone.

9. 3-ethyl - 5 - [(3-ethyl - 2 - benzoxazolinylidene)ethylidene] - 2 - [(1-ethylhexahydro - 4,6 - dioxo - 2-thioxo - 5 - pyrimidinylidene)ethylidene] - 1 - phenyl - 4-imidazolidinone.

10. 2-(1-carboxymethyl - 4 - oxo - 3 - phenyl-2-thioxo-5-imidazolidenylidene)ethylidene] - 3 - ethyl - 1 - phenyl-5-[(1,3,3-trimethyl - 2 - indolinylidene)ethylidene] - 4-imidazolidinone.

11. 2-[(2-diphenylamino - 4 - oxo - 2 - thiazolin-5-ylidene)ethylidene] - 3 - ethyl - 1 - phenyl-5-[(1,3,3-trimethyl - 2 - indolinylidene)ethylidene]-4-imidazlidinone.

12. 3-ethyl - 5 - [(3-ethyl - 2 - benzoxazolinylidene)ethylidene] - 2 - [(3-methyl - 5 - oxo - 1 - phenyl - 2-pyrazolin - 4 - ylidene)ethylidene] - 1 - phenyl - 4 - imidazolidinone.

13. 1,3-diethyl - 5 - [(3-ethyl - 2 - benzoxazolinylidene)ethylidene] - 2 - [(3 - ethyl - 4 - oxo - 2 - thioxo - 5-oxazolidinylidene)ethylidene]-4-imidazolidinone.

References Cited
UNITED STATES PATENTS

| | | | |
|---|---|---|---|
| 2,454,629 | 11/1948 | Brooker | 260—240.1 |
| 3,427,310 | 2/1969 | Gaspar | 260—240.1 |
| 3,576,639 | 4/1971 | Jenkins | 96—127 |

JOHN D. RANDOLPH, Primary Examiner

U.S. Cl. X.R.

96—105, 127; 260—240.4, 240.8